(12) United States Patent
Maes (10) Patent No.: US 9,094,805 B2
(45) Date of Patent: Jul. 28, 2015

(54) MOBILE MESSAGING CONCIERGE

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1710 days.

(21) Appl. No.: 10/851,049

(22) Filed: May 21, 2004

(65) Prior Publication Data

US 2004/0266408 A1 Dec. 30, 2004

Related U.S. Application Data

(60) Provisional application No. 60/482,513, filed on Jun. 25, 2003.

(51) Int. Cl.
*H04W 4/12* (2009.01)
*H04L 29/08* (2006.01)
*H04L 12/58* (2006.01)
*H04M 1/725* (2006.01)

(52) U.S. Cl.
CPC ............ *H04W 4/12* (2013.01); *H04L 67/04* (2013.01); *H04L 12/5835* (2013.01); *H04L 12/5895* (2013.01); *H04L 51/066* (2013.01); *H04M 1/72552* (2013.01); *H04M 1/72561* (2013.01)

(58) Field of Classification Search
USPC ......................... 709/202, 246, 217
See application file for complete search history.

(56) References Cited

U.S. PATENT DOCUMENTS

| | | | |
|---|---|---|---|
| 5,497,373 A | 3/1996 | Hulen et al. | |
| 5,850,517 A | 12/1998 | Verkler et al. | |
| 6,157,941 A | 12/2000 | Verkler et al. | |
| 6,163,274 A * | 12/2000 | Lindgren | 340/7.29 |
| 6,363,352 B1 | 3/2002 | Dailey et al. | |
| 6,430,624 B1 * | 8/2002 | Jamtgaard et al. | 709/246 |
| 6,463,078 B1 | 10/2002 | Engstrom et al. | |
| 6,473,609 B1 * | 10/2002 | Schwartz et al. | 455/406 |
| 6,535,486 B1 | 3/2003 | Naudus et al. | |
| 6,549,937 B1 | 4/2003 | Auerbach et al. | |
| 6,629,163 B1 | 9/2003 | Balassanian | |
| 6,636,888 B1 | 10/2003 | Bookspan et al. | |
| 6,732,103 B1 | 5/2004 | Strick et al. | |
| 6,738,822 B2 | 5/2004 | Fukasawa et al. | |
| 6,813,507 B1 * | 11/2004 | Gress et al. | 455/466 |
| 6,856,809 B2 | 2/2005 | Fostick | |
| 6,868,143 B1 * | 3/2005 | Menon et al. | 379/88.13 |
| 6,871,236 B2 * | 3/2005 | Fishman et al. | 709/246 |
| 6,879,997 B1 * | 4/2005 | Ketola et al. | 709/208 |
| 7,058,626 B1 * | 6/2006 | Pan et al. | 1/1 |
| 7,127,491 B2 * | 10/2006 | Zirnstein, Jr. | 709/206 |
| 7,203,505 B1 * | 4/2007 | Larikka et al. | 455/466 |
| 7,353,044 B2 * | 4/2008 | Nachef | 455/558 |
| 7,379,733 B2 | 5/2008 | Maes et al. | |

(Continued)

OTHER PUBLICATIONS

U.S. Appl. No. 10/857,659, filed May 8, 2004, Office Action mailed Jan. 24, 2007, 14 pages.

(Continued)

*Primary Examiner* — Backhean Tiv (74) *Attorney, Agent, or Firm* — Kilpatrick Townsend & Stockton LLP (57) ABSTRACT

A method for performing a service for a mobile device is provided. The method comprises: receiving a request from the mobile device for a service that is not natively supported by the mobile device; determining one or more resources needed to fulfill the request; and performing the service associated with the request using the one or more resources.

14 Claims, 4 Drawing Sheets

(56) References Cited

U.S. PATENT DOCUMENTS

| | | | |
|---|---|---|---|
| 7,406,429 B2 * | 7/2008 | Salonen ............................ 705/5 |
| 7,515,289 B2 * | 4/2009 | Ohtuka ........................ 358/1.15 |
| 7,519,720 B2 * | 4/2009 | Fishman et al. ............. 709/230 |
| 7,529,853 B2 | 5/2009 | Maes |
| 7,751,347 B2 * | 7/2010 | Giroti ........................... 370/260 |
| 8,028,073 B2 | 9/2011 | Maes et al. |
| 8,050,664 B2 * | 11/2011 | Salonen ........................ 455/417 |
| 2002/0049640 A1 * | 4/2002 | Sheriff et al. .................... 705/26 |
| 2002/0055975 A1 * | 5/2002 | Petrovykh ..................... 709/205 |
| 2002/0087704 A1 | 7/2002 | Chesnais et al. |
| 2002/0098831 A1 * | 7/2002 | Castell et al. ................. 455/413 |
| 2002/0103867 A1 * | 8/2002 | Schilter ........................ 709/206 |
| 2002/0118809 A1 | 8/2002 | Eisenberg |
| 2002/0143916 A1 * | 10/2002 | Mendiola et al. ............. 709/223 |
| 2002/0143930 A1 * | 10/2002 | Babu et al. .................... 709/224 |
| 2002/0159394 A1 | 10/2002 | Decker et al. |
| 2002/0163934 A1 | 11/2002 | Moore et al. |
| 2003/0054810 A1 | 3/2003 | Chen et al. |
| 2003/0079183 A1 * | 4/2003 | Tada et al. ..................... 715/515 |
| 2003/0093462 A1 | 5/2003 | Koskelainen et al. |
| 2003/0093565 A1 * | 5/2003 | Berger et al. ................. 709/246 |
| 2003/0101283 A1 * | 5/2003 | Lewis et al. ................... 709/246 |
| 2003/0104805 A1 | 6/2003 | Weksel |
| 2003/0130882 A1 * | 7/2003 | Shuttleworth et al. ............ 705/8 |
| 2003/0144895 A1 * | 7/2003 | Aksu et al. ........................ 705/9 |
| 2003/0182378 A1 * | 9/2003 | Treptow et al. ............... 709/206 |
| 2003/0187930 A1 * | 10/2003 | Ghaffar et al. ................ 709/205 |
| 2003/0191805 A1 | 10/2003 | Seymour et al. |
| 2003/0197892 A1 * | 10/2003 | Fukuoh ........................ 358/1.15 |
| 2003/0208546 A1 * | 11/2003 | DeSalvo et al. .............. 709/206 |
| 2003/0211856 A1 | 11/2003 | Zillacus |
| 2003/0224765 A1 * | 12/2003 | Udagawa et al. .......... 455/414.1 |
| 2004/0001226 A1 * | 1/2004 | Ohtuka ........................ 358/1.15 |
| 2004/0015723 A1 | 1/2004 | Pham et al. |
| 2004/0058694 A1 * | 3/2004 | Mendiola et al. ............. 455/466 |
| 2004/0119814 A1 | 6/2004 | Clisham et al. |
| 2004/0137919 A1 * | 7/2004 | Biundo ......................... 455/466 |
| 2004/0152454 A1 | 8/2004 | Kauppinem |
| 2004/0205618 A1 * | 10/2004 | Sini et al. ...................... 715/523 |
| 2004/0215974 A1 * | 10/2004 | Conley et al. ................. 713/201 |
| 2004/0218744 A1 | 11/2004 | Nguyen et al. |
| 2004/0249934 A1 * | 12/2004 | Anderson et al. ............. 709/224 |
| 2004/0252197 A1 * | 12/2004 | Fraley et al. ................ 348/207.1 |
| 2004/0266412 A1 | 12/2004 | Maes et al. |
| 2004/0267942 A1 | 12/2004 | Maes |
| 2005/0021624 A1 | 1/2005 | Herf et al. |
| 2005/0101338 A1 | 5/2005 | Kraft |
| 2005/0144233 A1 | 6/2005 | Kjesbu et al. |
| 2006/0013205 A1 | 1/2006 | Daniell et al. |
| 2006/0073821 A1 * | 4/2006 | Rantapuska .................. 455/423 |
| 2006/0216683 A1 * | 9/2006 | Goradia ........................ 434/322 |
| 2006/0287907 A1 * | 12/2006 | Kim ................................ 705/10 |
| 2007/0011104 A1 * | 1/2007 | Leger et al. ..................... 705/77 |
| 2007/0091365 A1 * | 4/2007 | Fu et al. ....................... 358/1.15 |
| 2007/0136360 A1 * | 6/2007 | Randall et al. ................ 707/102 |
| 2008/0106760 A1 * | 5/2008 | Ohtuka ........................ 358/1.15 |
| 2009/0006576 A1 * | 1/2009 | Kaufman et al. ............. 709/207 |
| 2009/0013045 A1 | 1/2009 | Maes et al. |
| 2009/0031284 A1 * | 1/2009 | Shenfield et al. ............. 717/114 |
| 2010/0045796 A1 * | 2/2010 | Fraley et al. .................. 348/143 |

OTHER PUBLICATIONS

U.S. Appl. No. 10/857,659, filed May 8, 2004, Final Office Action mailed May 31, 2007, 15 pages.

U.S. Appl. No. 10/857,659, filed May 8, 2004, Notice of Allowance mailed Dec. 31, 2007, 7 pages.

U.S. Appl. No. 10/850,841, filed May 21, 2004, Office Action mailed Apr. 29, 2008, 7 pages.

U.S. Appl. No. 10/850,841, filed May 21, 2004, Final Office Action mailed Nov. 12, 2008, 7 pages.

U.S. Appl. No. 10/850,841, filed May 21, 2004, Notice of Allowance mailed Feb. 25, 2009, 9 pages.

U.S. Appl. No. 12/060,156, filed Mar. 31, 2008, Office Action dated Aug. 2, 2010, 22 pages.

U.S. Appl. No. 12/060,156, filed Mar. 31, 2008, Final Office Action mailed Dec. 17, 2010, 21 pages.

U.S. Appl. No. 12/060,156, filed Mar. 31, 2008, Advisory Action mailed Mar. 4, 2011, 3 pages.

U.S. Appl. No. 12/060,156, filed Mar. 31, 2008, Notice of Allowance dated May 12, 2011, 10 pages.

U.S. Appl. No. 10/857,659, Restriction Requirement mailed on Oct. 20, 2006, 5 pages.

* cited by examiner

FIG. 4

MOBILE MESSAGING CONCIERGE

CROSS-REFERENCES TO RELATED APPLICATIONS

This application claims the benefit of the filing date of U.S. Provisional Patent Application No. 60/482,513, filed Jun. 25, 2003, which is incorporated by reference in its entirety for all purposes.

BACKGROUND OF THE INVENTION

The present invention generally relates to mobile messaging. More particularly, the present invention relates to methods and apparatus for performing non-native services for a mobile device.

Mobile devices include cellular phones, personal digital assistants (PDAs), pocket personal computers, blackberry-type devices, pagers, and the like. Typical services provided by the devices include e-mail retrieval, elementary calendaring, contact list access, voice portal services (stock, weather, and event reservations), car navigation services, and directory dialing dialer services.

Although widely-used, typical mobile devices have many limitations. For example, the mobile devices typically have a limited set of supported services. These services are termed native services. Current typical mobile devices are also closed platforms; thus, users cannot upgrade the mobile devices to include other desired services. Because of this, the user is limited to performing the functions that have been designed for and pre-installed into the mobile device.

Users of mobile devices often use the devices for reading and composing e-mail messages. Although a user can send and receive e-mails, again the mobile devices have many limitations. For example, when attachments are sent with an e-mail, the attachments are typically not included with the e-mail. Thus, a user cannot read the attachment. Further, because the attachment has not been sent with the e-mail, a user cannot forward the attachment to another user or do any processing with the attachment. As still another limitation, only certain formats of documents are natively supported.

In light of the above, what is desired are methods and apparatus for providing mobile devices with support for non-native services.

BRIEF SUMMARY OF THE INVENTION

Embodiments of the present invention relate to performing non-natively supported services for a mobile device using a processing device. Requests may be sent to the processing device where the actions are performed for mobile devices.

In one embodiment, a method for performing a service for a mobile device is provided. The method comprises: receiving a request from the mobile device for a service that is not natively supported by the mobile device; determining one or more resources needed to fulfill the request; and performing the service associated with the request using the one or more resources.

In another embodiment, a method for generating a query for one or more services to be performed at a mobile device is provided. The method comprises: receiving input specifying a query; generating a query for a service that is not natively supported by the mobile device from the input received; and sending the query for the service to a processing device, wherein the service is performed by the processing device.

In yet another embodiment, an apparatus for performing a service for a mobile device is provided. The apparatus comprises: a receiver configured to receive a request from the mobile device for a service that is not natively supported by the mobile device; a resource processor configured to access one or more resources for the request; and an action processor configured to perform the service associated with the request using the accessed one or more resources.

In another embodiment, a system for performing actions is provided. The system comprises: one or more mobile devices; one or more resources; and a processor configured to communicate with the one or more mobile devices and have access to the one or more resources, wherein a request from a mobile device in the one or more mobile devices for an action that is not natively supported by the mobile device, wherein the processor performs the action using a resource in the one or more resources.

In another embodiment, a mobile device configured to communicate with a processing device to enable actions to be performed is provided. The mobile device comprises: an interface to provide one or more inputs usable to generate a query; an input receiver to receive information from the one or more inputs for a query; a query generator to generate the query from the received information for an action that is not natively supported by the mobile device; and a transmitter configured to send the generated query to the processing device, wherein the query is usable by the processing device to perform the action that is not natively supported by the mobile device.

Embodiments of the present invention may also be included on a computer readable medium.

A further understanding of the nature and the advantages of the inventions disclosed herein may be realized by reference of the remaining portions of the specification and the attached drawings.

DETAILED DESCRIPTION OF THE INVENTION

Figure 1:
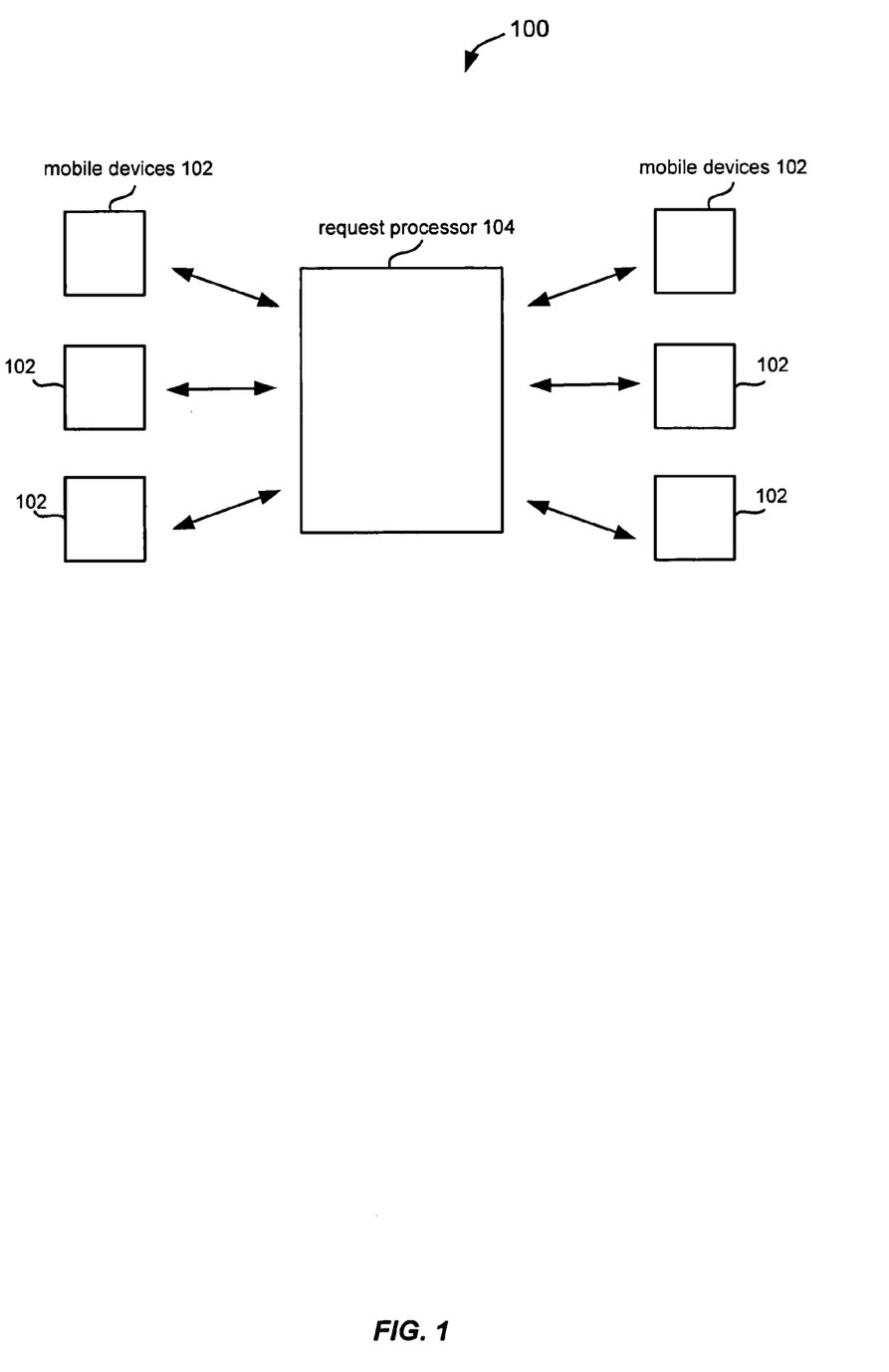
FIG. 1 illustrates a system for enabling the processing of requests from one or more mobile devices according to one embodiment of the present invention.

FIG. 1 illustrates a system 100 for enabling the processing of requests from one or more mobile devices 102 according to one embodiment of the present invention. As shown, mobile devices 102 communicate with a request processor 104. The communications may be through any communication medium, such as the Internet, a wireless network, a wire line network, a cellular network, a local area network (LAN), a wide area network (WAN), and the like.

Mobile devices 102 include any devices that can communicate with request processor 104. Examples of mobile devices 102 include cellular phones, personal digital assistants (PDAs), laptop computers, pocket PCs, mobile messengers, blackberry-type devices, pagers, and the like. Although mobile devices 102 will be described with respect to mobile devices, it will be understood that mobile devices 102 are not limited to devices that are mobile. For example, personal computers (PCs), workstations, wire line telephones, and the like may be used to communicate with request processor 104.

Mobile devices 102 communicate with request processor 104 using a variety of methods. In one embodiment, short message service (SMS), e-mail, voice over a voice connection, sending dual tone multi-frequency (DTMF) signals via a touch tone telephone, multimedia service (MMS), messages sent online, messages sent through a website, messages sent through an application, and the like may be used to communicate with request processor 104. A single message or multiple messages may be used to communicate a request to request processor 104. The multiple messages may include a question and answer exchange to determine the appropriate request desired.

Request processor 104 includes any device capable of receiving requests from mobile devices 102 and any device able to perform actions related to the request. Request processor 104 may include a number of computing devices needed to provide services to mobile devices 102.

In one embodiment, request processor 104 is a server side agent that can access any resources that are necessary to complete a request from mobile device 102. For example, request processor 104 may access the Internet, a user's network (LAN, WAN), access or manipulate a user's desktop and file systems, access other online file system resources, execute tasks (either local or remote; e.g., via web services), etc. Request processor 104 provides services that are not natively supported by mobile devices 102. For example, these services are services not offered by a provider of mobile device 102, services mobile device 102 cannot perform, or services mobile device 102 has not been programmed to perform. Examples of services that request processor 104 may perform include finding a file or message, converting a file from one format to another, faxing or printing (e.g., via web service call to a remote printer address/wrapped with a web service), etc. Request processor 104 is also extensible in that new services may be enabled by including new modules as plug-ins in request processor 104.

Figure 2:
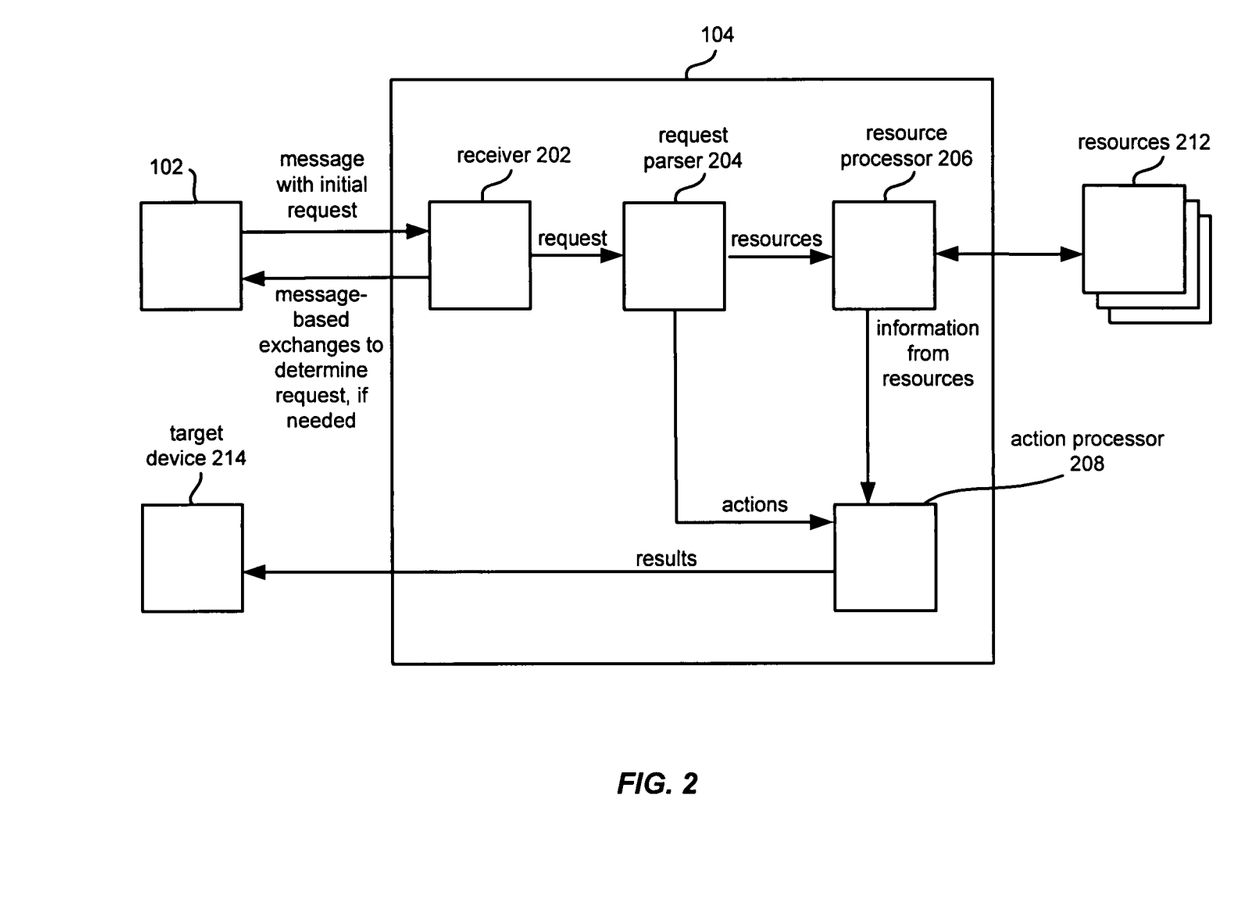
FIG. 2 illustrates an embodiment of a request processor according to the present invention.

FIG. 2 illustrates an embodiment of request processor 104 according to the present invention. In one embodiment, request processor 104 includes a receiver 202, a request parser 204, a resource processor 206, and an action processor 208. These modules may be implemented in hardware, software or any combination thereof.

Receiver 202 is configured to receive requests for actions from mobile devices 102. In one embodiment, mobile device 102 sends an initial message with an initial request to receiver 202. Receiver 202 can then process the request and determine if additional information is needed to determine a final request. For example, the initial request may request emails received from a person named Smith be retrieved. Request processor 104 could return all emails received from people named Smith or may send questions back to mobile device 102 asking for Smith's first name. One or more message-based exchanges (e.g., SMS, MMS, emails, voice conversations, etc) may be used to determine the person's first name. Once the final request is determined, receiver 202 sends the request to request parser 204.

Request parser 204 is configured to parse the request to determine one or more actions that need to be performed by request processor 104. For example, the request may be in the form of one or more keywords. Taking the keywords together, the keywords may indicate different actions depending on the combination of keywords. For example, the keywords may indicate that an attachment not included in the email should be reattached to an e-mail in a certain format. Also, an attachment in an incompatible format for mobile device 102 may be converted to a text format and included in an e-mail to mobile device 102.

In order to allow interoperability with different mobile devices 102, request parser 204 may also translate requests that are received from mobile devices 102 into a format understandable by request processor 104. For example, messages may be received from multiple devices that communicate in different protocols. Request parser 204 may translate those requests into a generic language that is used by request processor 104. In another embodiment, request parser 204 is configured to understand different protocols used by different mobile devices 102.

Once a request is parsed, request parser 204 sends information about which resources 212 should be accessed by resource processor 206. For example, resources 212 include any resources that are needed to fulfill the request for mobile device 102. Resources 212 include a user's e-mail server, a user's desktop, any applications a user may desire, any storage that includes files that are needed, etc. Also, a person skilled in the art will appreciate other resources 212 that may be used. Additionally, mobile device 102 may send resources to resource processor 206 or other devices may send resources to resource processor 206. For example, mobile devices 102 may send a document that needs to be converted to a different format.

Resource processor 206 is configured so that it can access any resources 212 that are needed. Thus, actions may be performed that may not have been available because mobile device 102 would not be able to access certain resources 212.

Resource processor 206 determines which resources from resources 212 are needed to fulfill the request. The information from resources 212 is then sent to action processor 208. For example, the information may be documents, emails, files, etc. It will be understood that information may not be retrieved from resources 212; rather, a reference to the needed information may be sent to action processor 208 or any other methods to access information a person skilled in the art will appreciate may be used.

Action processor 208 performs the specified actions using the information. In one example, the actions generate one or more results, such as a converted document. The converted document is then sent to a target device 214. In another example, the action is to retrieve the document and send it to a target device 214.

In one embodiment, target device 214 may be the mobile device 102 that sent the request. Also, in another embodiment, target device 214 may be a device other than the mobile device 102 that sent the request. For example, target device 214 may be a printer, a facsimile (fax) machine, a PC, another mobile device 102, etc. Accordingly, a user is not limited to performing tasks for just mobile device 102. Rather, through mobile device 102 and request processor 104, a user may perform actions on devices were previously inaccessible to mobile device 102.

Request processor 104 may send the results using any communications methods. For example, an attachment that has been converted to a format compatible with target device 214 may be sent through methods supported by target device 214. In one case, an HTML page may be converted to a text format and sent in an e-mail to target device 214. In the case where an action such as faxing or printing with a remote device is requested, target device 214 may be a printer or a fax machine. In this case, request processor 104 may send a command to the printer or fax machine with the information that will be printed or faxed. For example, the printer can print and the fax machine can fax a document, email, spreadsheet, presentation, etc. Also, request processor 104 may send a confirmation to the requesting mobile device 102 indicating that a request has been fulfilled when target device 214 is not the requesting mobile device 102.

Figure 3:
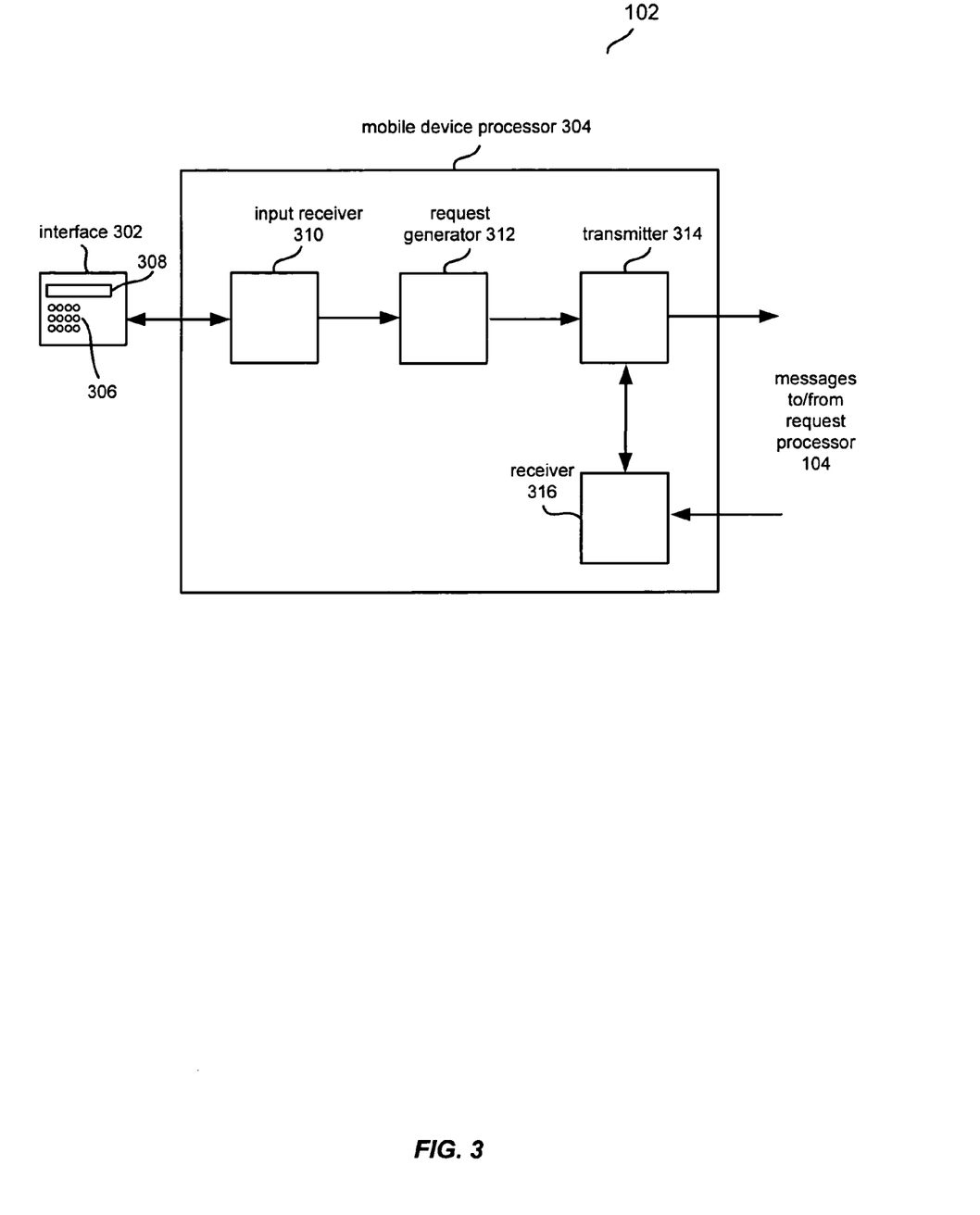
FIG. 3 illustrates an embodiment of a mobile device according to the present invention.

FIG. 3 illustrates an embodiment of mobile device 102 according to the present invention. Mobile device 102 includes an interface 302 and a mobile device processor 304.

Interface 302 is provided so that a user may send information that is used to generate a request to mobile device processor 304. For example, interface 302 may include an input receiver device 306 and a display 308. Input receiver device 306 may be used to generate keywords that will be used in the request. In one embodiment, input receiver device 306 includes a keypad, microphone, handwriting recognition pad, or the like. Also, display 308 may include a form that includes keywords or entire requests that may be selected using input receiver device 306. In one example, in order to generate the query, a blackberry-type device may receive text input, a cellular phone may receive voice or keypad inputs, etc. Once a query is generated using interface 302, the query is sent to mobile device processor 304. Request processor 104 is then configured to recognize the keywords and perform actions that correspond to the keywords.

In one embodiment, mobile device processor 304 includes an input receiver 310, a request generator 312, a transmitter 314, and a receiver 316. Input receiver 310 receives input information from interface 302. Input receiver 310 includes logic that may be used to recognize information received from input device 306. For example, input receiver 310 may include voice recognition software, handwriting recognition software, etc. The information received is then sent to request generator 312.

Request generator 312 is configured to generate a request from the received information. Using the above example, the text input from a blackberry-type device may specify a query. For example, the input may have indicated that an attachment should be sent in a certain format. The request may have been generated using one or more keywords. Request generator 312 then may send those keywords to transmitter 314 or generate a new request that corresponds to the keywords sent from interface 302.

Transmitter 314 then sends the generated request to request processor 104. If additional messaging is needed, receiver 316 may receive questions from request processor 104 and transmitter 314 will send answers back to request processor 104. Also, any further messaging, such as the results of the request or confirmation that the request has been fulfilled are received at receiver 316.

Figure 4:
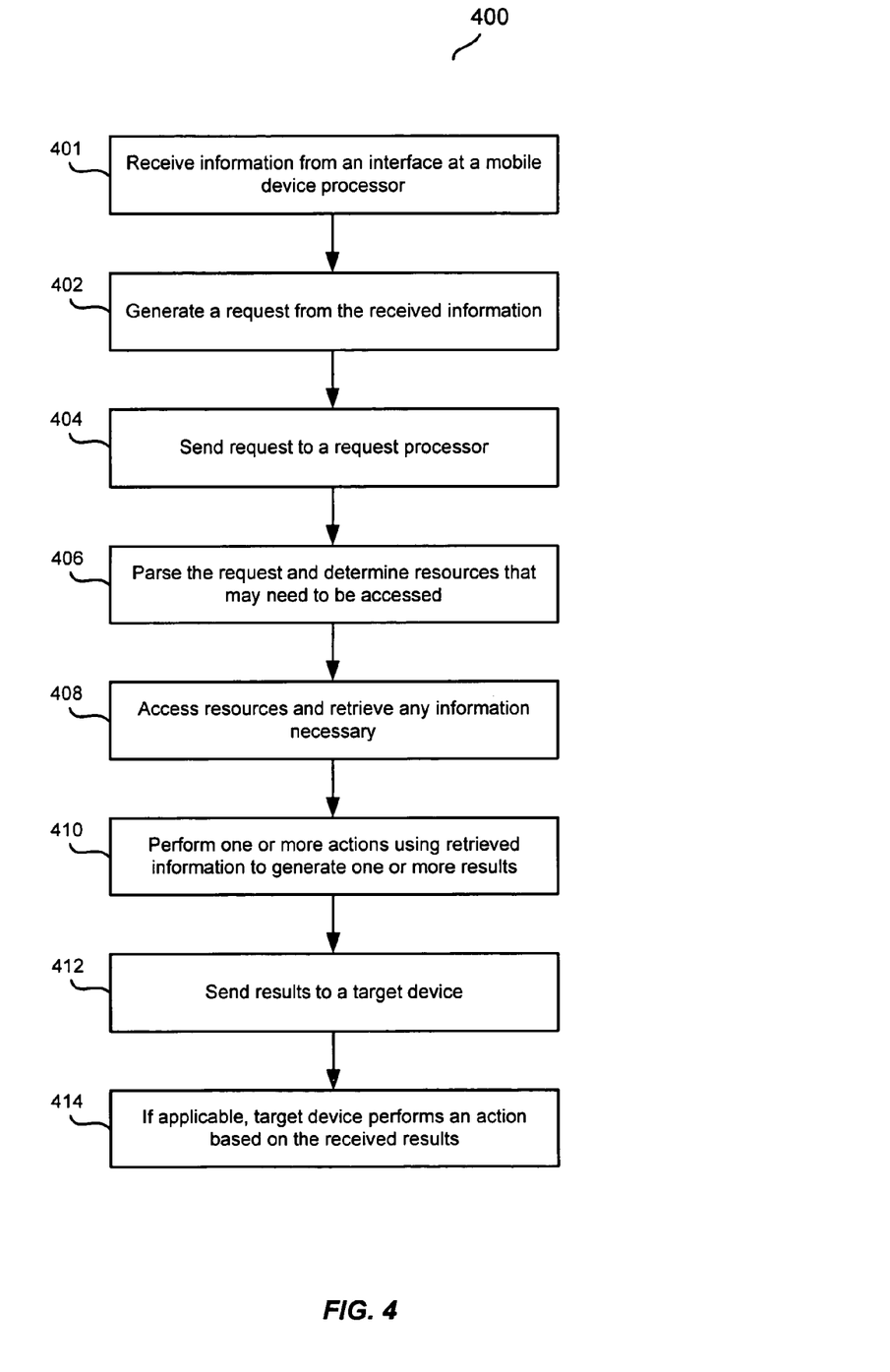
FIG. 4 illustrates a flow chart of a method for enabling a request to be performed for mobile devices according to one embodiment of the present invention.

FIG. 4 illustrates a flow chart 400 of a method for enabling a request to be performed for mobile devices 102 according to one embodiment of the present invention. In step 401, information is received from interface 302 at mobile device processor 304. The information indicates a request from a user. In one embodiment, the request may be a series of keywords that can be used to determine actions that should be performed. Also, the request is a request that is not natively supported by mobile device 102. Thus, a user of mobile device 102 generates an ad hoc request using input device 306 and, for example, keywords or generic menus.

In step 402, mobile device processor 304 generates a request from the information received from interface 302. The request may be the same as the information received or may be translated into another form. In step 404, the request is sent to request processor 104.

In step 406, request processor 104 parses the request and determines resources 212 that may need to be accessed, if necessary, and also determines actions that should be performed using the accessed resources 212. In step 408, resources 212 are accessed and any information that needs to be retrieved is retrieved. In one embodiment, resources 212 are typically resources that mobile device 102 cannot directly access. For example, resources 212 may be an email server including archived emails, files stored on a desktop, archived documents, etc. Thus, request processor 104 may retrieve previously inaccessible emails and send them to mobile device 102, access documents stored in a desktop and send them to a user, and access archived documents, convert them to a format readable by mobile device 102, and send the converted documents to mobile device 102.

In step 410, one or more actions are performed using the retrieved information from the accessed resources 212. The actions may generate one or more results. Actions, for example, may be converting a document to another format, retrieving a document to a fax machine, retrieving a presentation. In step 412, the results are then sent to a target device 214. For example, the converted document may be sent to mobile device 102, the retrieved document sent to a fax machine for faxing, or the presentation sent to mobile device 102.

In step 412, target device 214 may perform an action based on the received results. For example, a printer may print a received document or a fax machine may fax a received document.

Accordingly, services that are not natively supported by mobile devices may be performed using request processor 104. Accordingly, the limitations of the processing capabilities of mobile devices 102 are satisfied by embodiments of the present invention.

One example of the services that request processor 104 may perform is the processing of attachments. Request processor 104 may process attachments that a mobile device 102 is unable to display or read. Mobile device 102 may be unable to read attachments because an attachment is in a format that mobile device 102 cannot display, the channel does not support transmitting the attachment, the format of the attachment is not supported by mobile device 102, etc.

In the example, mobile device 102 generates a request and sends the request to request processor 104. The request may be in the form of messages (e.g., email, SMS, or notifications (e.g., MMS)). Also, the request may also include an indication of which email and attachment mobile device 102 could not display. Request processor 104 then accesses an email database associated with mobile device 102 and retrieves the email and the attachment. Using the information from the request, an action is performed where the attachment is adapted to a format that is indicated in the request. For example, the attachment may be adapted to the format a target device 214 may support and/or a format that target device 214 can display. As mentioned above, the attachment may be converted into a text document and sent in an email to target device 214.

If request processor 104 is unable to adapt the email or the attachment to the format desired, request processor 104 may extract the stored attachment and link it to an identifier such as a uniform resource location (URL). The attachment is then adapted to a format mobile device 102 and the target channel can read and display when the identifier is selected. For example, mobile device 102 may not be able to read the format of the attachment or request processor 104 may not be able to adapt the attachment to a format target device 214 can read; however, target device 214 may be able to retrieve web pages at a URL. Accordingly, when the web page is retrieved using the URL, the attachment can be read on the web page.

Also, in some cases, attachments are not conventionally sent to mobile devices 102 because the attachments are in an unreadable format for mobile device 102 or mobile device 102 is not configured to receive attachments. Thus, these mobile devices 102 cannot forward the attachments to another device. Using request processor 204, an attachment that was not attached to an email sent to mobile device 102 may be sent to another user or another email address because request processor 104 can access the attachment and send an email for mobile device 102.

In another example, a user may use mobile device 102 to cause devices to perform certain operations. For example, in order to fax a document, the document must be scanned or electronically sent to a fax machine. A user can fax a document using mobile device 102 by sending a message to request processor 104. Request processor 104 can then retrieve a document and send it to a fax machine for faxing.

In another example, some mobile devices 102 are not able to re-access email once it has been removed from the mobile device 102. If the user needs to re-access the email, a request may be generated that will enable request processor 104 to retrieve the email and send the email back to the mobile device 102.

Examples of other actions or services that may be performed by request processor 104 include obtaining detailed contact information for a user, updating information in an agenda, obtaining the availability of a colleague from a calendar system, obtaining presence-based information, such as in instant messaging and unified messaging, where the information is not compatible with an IM client or the mobile device, obtaining room availability for rental rooms, performing a room reservation, updating a user's calendar, sending a message to a person or device that includes the contents, attaching a file to a message, accessing a file, printing a file, editing a file, converting a file, signing a document, proofing a document, checking presence of a user, checking locations using a global positioning service, getting directions, setting up presence information, a profile, contact rules, etc. in instant messaging or unified messaging, setting up email preferences and filters, reviewing browser-received emails, processing a particular email, chatting/IM'ing with a colleague, etc. All these applications are examples of non-native actions of a mobile device 102. What is meant by supporting the actions is that the device has not been programmed to include commands that directly support the actions and thus cannot perform the actions.

Embodiments of the present invention provide many advantages. For example, users of mobile devices can have non-native operations performed. Thus, users are not limited to the operations that have been programmed on the mobile device. This makes the mobile device more powerful and flexible.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for performing a service for a mobile device, the method comprising:
    receiving a request at a request processor system from the mobile device, the request for a service that is not natively supported by the mobile device and indicating a plurality of actions to be performed by the service, wherein the mobile device is not able to perform the actions, wherein each of the plurality of actions comprises a different action, wherein the request comprises a Short Message Service (SMS) message having text in a body of the message describing the actions or a Multimedia Message Service (MMS) message having text in a body of the message describing the;
    conducting a message-based exchange between the request processor system and the mobile device, wherein the message-based exchange between the request processor system and the mobile device comprises an exchange of a plurality of SMS or MMS messages in a question and answer exchange;
    processing the request with the request processor system to determine the plurality of actions described in the text of the body of the request, wherein processing the request comprises parsing the text of the body of the messages of the message-based exchange for one or more keywords in the messages, and wherein determining the plurality of actions that need to be performed to fulfill the request is based on the one or more keywords;
    selecting with the request processor from a plurality of resources one or more resources needed to perform each determined action;
    accessing with the request processor system the selected resources and performing with the request processor system each determined action associated with the request using the selected resources; and
    when performing the service generates at least one result, transmitting each result from the request processor system to the mobile device.

2. The method of claim 1, wherein performing the service comprises:
    performing an action with the request processor system to generate a result; and
    sending the result from the request processor system to a target device.

3. The method of claim 2, wherein the target device comprises at least one of the mobile device and a device other than the mobile device.

4. The method of claim 1, wherein performing the service comprises:
    retrieving the determined resources with the request processor system; and
    sending the determined resources from the request processor system to a target device.

5. The method of claim 1, wherein the request comprises a query generated by the mobile device.

6. The method of claim 1, wherein performing the service comprises:
    determining with the request processor system an attachment that is in a format the mobile device does not support;
    converting the attachment with the request processor system to a format specified in the request; and
    sending the attachment from the request processor system to a target device.

7. An apparatus for performing a service for a mobile device, the apparatus comprising:

a receiver configured to receive a request from the mobile device, the request for a service that is not natively supported by the mobile device and indicating a plurality of actions to be performed by the service, wherein the mobile device is not able to perform the actions, wherein each of the plurality of actions comprises a different action, wherein the request comprises a Short Message Service (SMS) message having text in a body of the message describing the actions or a Multimedia Message Service (MMS) message having text in a body of the message describing the actions and wherein receiving the request includes conducting a message-based exchange between the request processor system and the mobile device, wherein the message-based exchange between the request processor system and the mobile device comprises an exchange of a plurality of SMS or MMS messages in a question and answer exchange;

a request parser configured to parse the request and messages of the message-based exchange to determine the plurality of actions described in the text of the body of the request, wherein processing the request comprises parsing the text of the body of the messages of the message-based exchange for one or more keywords in the messages, and wherein determining the plurality of actions that need to be performed to fulfill the request is based on the one or more keywords;

a resource processor configured to select from a plurality of resources one or more resources needed to perform each determined action and to access the selected resources;

an action processor configured to perform each determined action associated with the request using the selected resources; and a transmitter configured to transmit a result of the service to a target device.

8. The apparatus of claim 7, wherein the target device comprises at least one of the mobile device and a device other than the mobile device.

9. The apparatus of claim 7, further comprising a request processor configured to determine a service to be performed from the request.

10. The apparatus of claim 7, wherein the receiver is configured to perform messaging with the mobile device to determine the request.

11. The apparatus of claim 7, wherein the resources accessed by resource processor are not accessible by the mobile device directly.

12. A system for performing actions, the system comprising:
   a plurality of mobile devices;
   one or more resources; and
   at least one processor system configured to communicate with the plurality of mobile devices and operable to:
      receive a request from a requesting mobile device in the plurality of mobile devices, the request indicating a plurality of actions that are not natively supported by the requesting mobile device, wherein the mobile device is not able to perform the actions, wherein each of the plurality of actions comprises a different action, wherein the request comprises a Short Message Service (SMS) message having text in a body of the message describing the actions or a Multimedia Message Service (MMS) message having text in a body of the message describing the actions;
      conduct a message-based exchange between the request processor system and the mobile device, wherein the message-based exchange between the request processor system and the mobile device comprises an exchange of a plurality of SMS or MMS messages in a question and answer exchange;
      parse the request and messages of the message-based exchange to determine the plurality of actions described in the text of the body of the request, wherein processing the request comprises parsing the text of the body of the messages of the message-based exchange for one or more keywords in the messages, and wherein determining the plurality of actions that need to be performed to fulfill the request is based on the one or more keywords;
      select from a plurality of resources one or more resources needed to perform each determined action;
      access the selected resources and perform each determined action using the selected resources; and
      transmit a result of the service to a target device.

13. The system of claim 12, wherein the target device comprises one of the plurality of mobile devices and a device other than the requesting mobile device.

14. The system of claim 12, wherein the one or more resources are not directly accessible by the requesting mobile device.

* * * * *

UNITED STATES PATENT AND TRADEMARK OFFICE
CERTIFICATE OF CORRECTION

PATENT NO. : 9,094,805 B2  
APPLICATION NO. : 10/851049  
DATED : July 28, 2015  
INVENTOR(S) : Maes Page 1 of 1

It is certified that error appears in the above-identified patent and that said Letters Patent is hereby corrected as shown below:

In the claims,

In column 8, line 14, in Claim 1, after "message" delete "describing the;" and insert -- describing; --, therefor.

Signed and Sealed this  
Eighth Day of March, 2016

Michelle K. Lee  
*Director of the United States Patent and Trademark Office*